E. G. DOLAND.
BRAKE MECHANISM FOR WAGONS.
APPLICATION FILED JUNE 24, 1908.
903,847.
Patented Nov. 17, 1908.
2 SHEETS—SHEET 1.
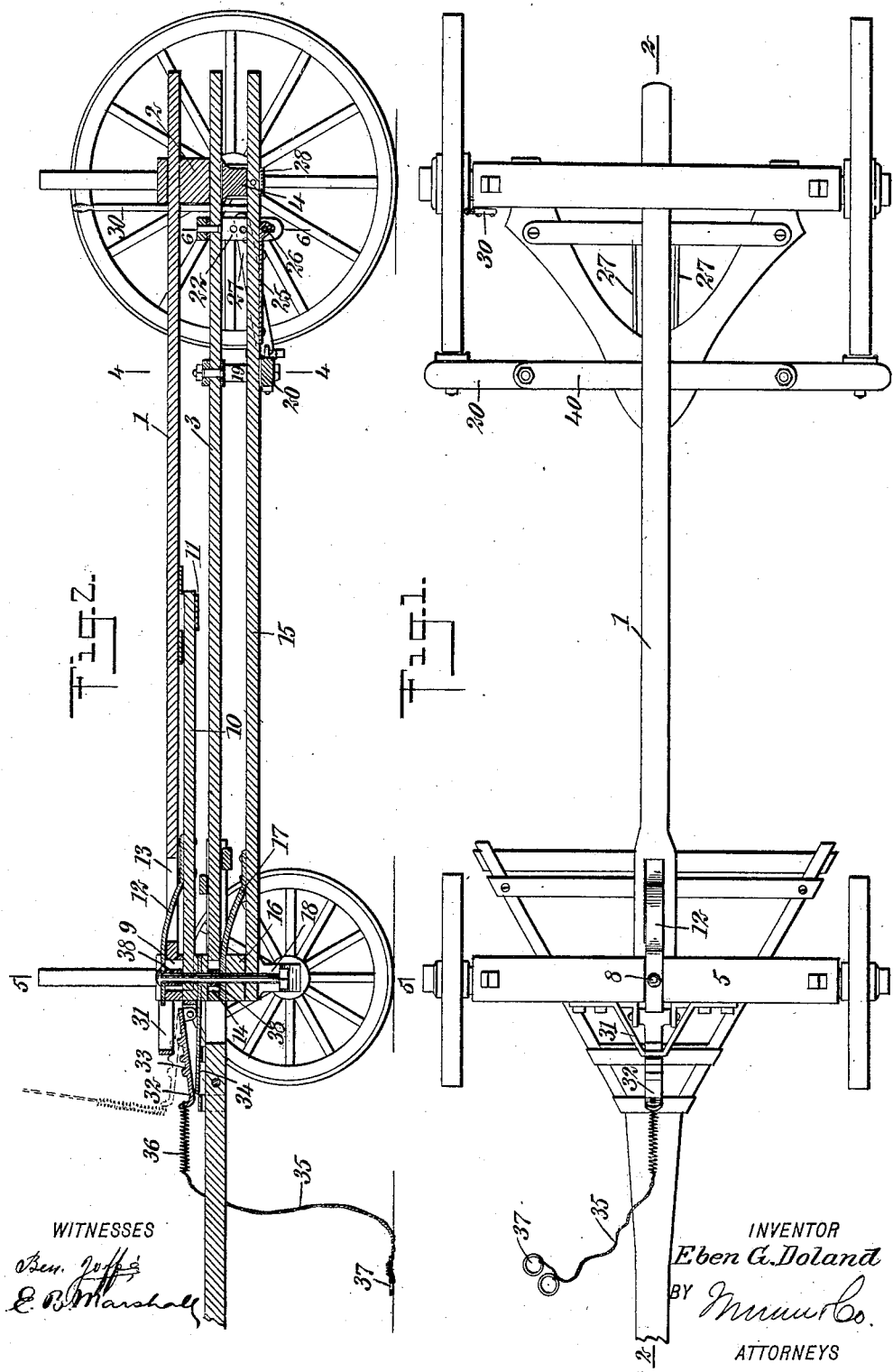
WITNESSES
INVENTOR
Eben G. Doland
BY
ATTORNEYS

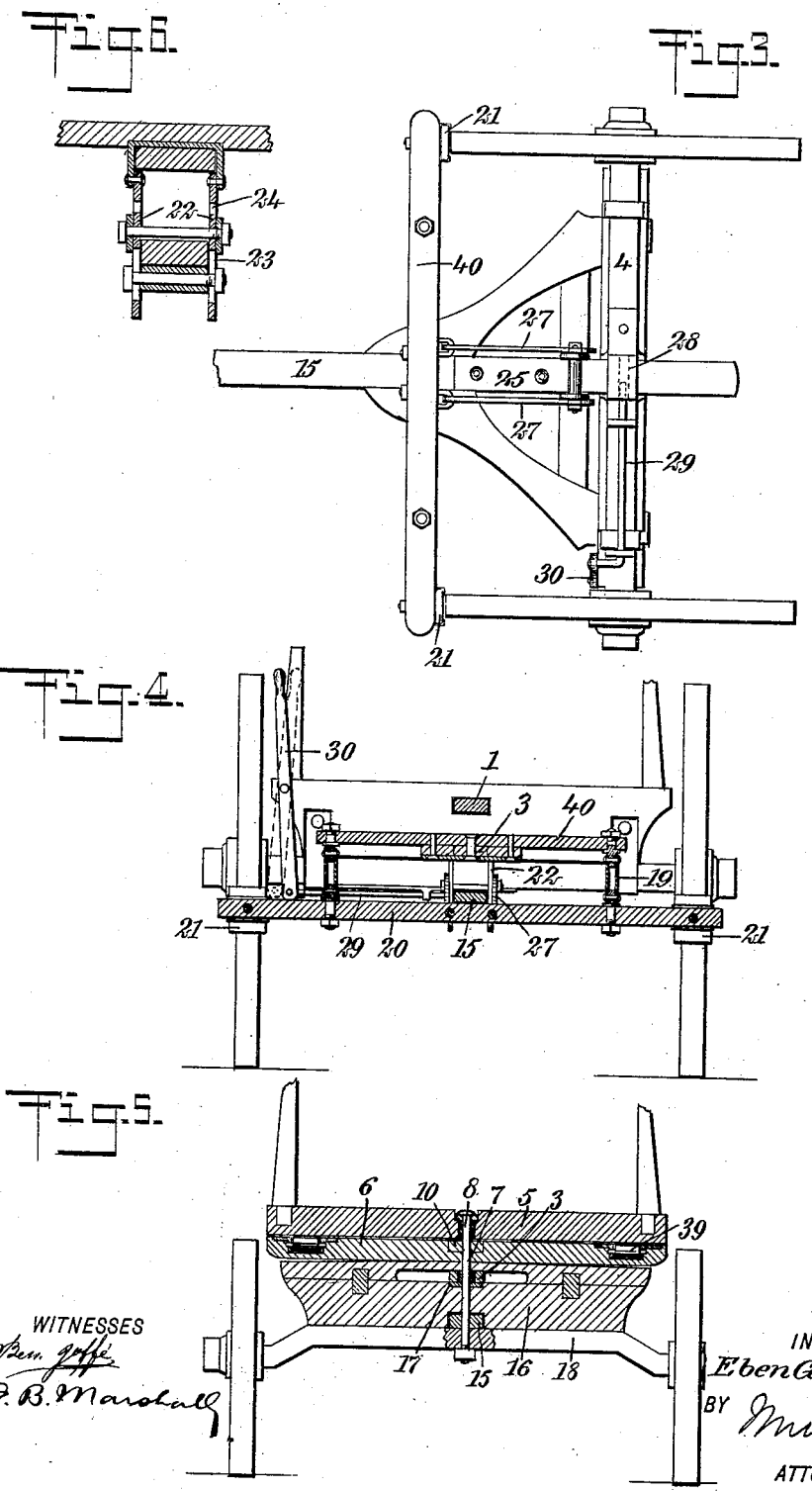

UNITED STATES PATENT OFFICE.

EBEN G. DOLAND, OF STARKSBORO, VERMONT.

BRAKE MECHANISM FOR WAGONS.

No. 903,847.  Specification of Letters Patent.  Patented Nov. 17, 1908.

Application filed June 24, 1908. Serial No. 440,095.

*To all whom it may concern:*

Be it known that I, EBEN G. DOLAND, a citizen of the United States, and a resident of Starksboro, in the county of Addison and State of Vermont, have invented a new and Improved Brake Mechanism for Wagons, of which the following is a full, clear, and exact description.

My invention relates to wagons, and it has for its object to provide a very effective brake which may be operated by any back pressure on the front axle which is greater than that on the rear axle. This I accomplish by the following construction. The front bolster is divided and there is a slot longitudinal of the wagon in the upper part of the bolster, in which the coupling pin is free to travel, the coupling pin fitting closely an orifice in the lower half of the bolster, there being secured to the lower half of the bolster, an arm which is disposed under the main reach, which is secured to the upper part of the bolster, the main reach having a sleeve disposed therebeneath, through which the arm on the lower half of the bolster extends. The upper half of the front bolster is kept parallel with the rear bolster by the main reach. The reach which passes between the cross hounds is also slotted at its front end and in this slot extends the coupling pin. The coupling pin also passes through the front axle and the brake reach, but it fits the latter snugly with no room for play and as this brake reach is pivoted to pivoted arms, which are connected with the brake bar by links, it will be seen that the longitudinal movement of the brake reach relatively to the other reaches, will operate the brakes, the degree of the movement of the brakes being regulated by the adjustment of the links to the pivoted arms. Means are provided at the front and the rear of the wagon for preventing the operation of the brake mechanism.

In this specification, I will describe the preferred form of my invention, but it will be understood that I do not limit myself thereto, as I consider myself to be entitled to all forms and embodiments of the invention which may be held to fall within the scope of the appended claims.

Reference is to be had to the accompanying drawings, forming a part of this specification, in which similar characters of reference indicate corresponding parts in all the figures, in which Figure 1 is a plan view of a wagon frame to which my brake mechanism has been applied; Fig. 2 is a sectional view on the line 2—2 of Fig. 1; Fig. 3 is an inverted plan view of the rear axle of the wagon, the brake bar, the brake shoes and my mechanism for operating the brake bar; Fig. 4 is a sectional view on the line 4—4 of Fig. 2; Fig. 5 is a sectional view on the line 5—5 of Fig. 2; and Fig. 6 is a sectional view on the line 6—6 of Fig. 2.

By referring to the drawings, it will be seen that a main reach 1 passes through a rear bolster 2 and is secured thereto and that a second reach 3 passes between the rear bolster 2 and an axle 4. These reaches 1 and 3 are secured to the rear bolster 2, as stated. The front bolster is divided, and to the upper half 5 of the front bolster is secured the main reach 1, there being a slot longitudinal of the reach in the said upper half 5 of the front bolster. The lower half 6 of the front bolster has an opening 7 therein, through which a coupling pin 8 is disposed, this coupling pin 8 also passing through a slot 9 in the upper half of the front bolster. The lower half of the front bolster has an arm 10 secured thereto, this arm 10 being disposed under the main reach 1 and passing through a sleeve 11 which is secured to the lower surface of the said main reach 1. By this means the arm 10 secured to the lower half of the front bolster and the main reach 1 secured to the upper half of the front bolster, will always be in alinement, though they may move longitudinally, relatively to each other. A guide 12 is secured to the arm 10 and is disposed obliquely through a slot 13 in the main reach 1, this guide 12 passing over the top of the front bolster with an orifice in alinement with the orifice 7 in the lower half of the front bolster, to permit the coupling pin 8 to pass therethrough. The front end of the reach 3 has a slot 14 therein, this slot 14 being in alinement with the slot 9 in the upper half of the front bolster, to which the main reach 1 is secured. Between the front end of the reach 3 and the front end of a brake reach 15 is disposed a bolster member 16 and a wear plate 17, the wear plate 17 being disposed between the bolster member 16 and the front end of the reach 3. Below the front end of the brake reach 15 is disposed an axle 18. The coupling pin 8 therefore, passes through the guide 12, the slot 9 in the upper half of the front bolster, to which the main reach 1 is secured, the closely fitting orifice 7 in the lower half of the front bolster, the slot 14 in the reach 3, a closely fitting orifice in the bolster member 16, the closely fitting orifice in the brake reach 15, and a closely fitting orifice in the axle 8. It will, therefore, be seen that while the coupling pin 8 will hold the several parts together, the reaches 1 and 3 are adapted to move forwardly or rearwardly relatively to the other members, and that as these reaches 1 and 3 are secured to the rear bolster 2 and to the rear axle 4, the rear bolster and axle are adapted to move to and from the front axle 18 and the bolster disposed thereover. To a cross-bar 40 are pivoted arms 19 to which is hung, under the brake reach 15, a brake bar 20, there being brake shoes 21 secured to the brake bar 20, the cross-bar 40 being secured to the frame. There are also pivoted to the reach 3, arms 22, these arms 22 having slots 23 near their lower terminals and having a plurality of orifices 24 between the slots 23 and their upper terminals.

Secured to the lower surface of the brake reach 15 is a plate 25, through which at its rear end passes a bar 26, this bar 26 also passing through the slots 23 in the arms 22. Pivoted to the arms 22, above the plate 25, are links 27, the other terminals of these links 27 being pivoted to the brake bar 20. The links 27 may be pivoted to the arms 22 at any of the orifices 24, so that it is possible to adjust the brake bar relatively to the brake reach 15. The rear end of the brake reach 15 passes through an opening in a member 28, the said member 28 serving to support the rear end of the brake reach. Below the axle is disposed a bar 29, which is adapted to pass through the sides of the member 28 and through an opening in the brake reach 15, so that when this bar 29, which is adapted to slide through the opening in the brake reach 15, is thrown therethrough, it will hold the brake reach 15 secured to the rear axle 4, which will prevent the movement of the brake reach 15 relatively to the reaches 1 and 3. The bar 29 has its outer terminal bent so that it will engage a lever 30 which is pivoted to the rear bolster 2. To the upper part 5, of the front bolster is secured a U-shaped member 31, and to the lower half of the front bolster is pivoted an arm 32 having notches 33 therein, these notches 33 being adapted to engage the front portion of the U-shaped member 31. A plate 34 is disposed under the arm 32 to serve as a support. To this arm 32 is secured a line 35, and it is preferable to connect the said line 35 with the arm 32 by means of a spring 36. This line 35 may have rings 37 at its free terminal, and the line 35 may be so disposed that when a driver is riding on the top of a very high load, he will be able, by means of the said line, to prevent the operation of the brakes at any time, for when the line 35 is drawn upwardly the notches 33 on the arm 32 will engage the front end of the U-shaped member 31, which will prevent the relative movement of the reach 1 with reference to the front bolster and to the brake reach 15. It will, therefore, be seen that when the brakes are not applied and the notches 33 in the arm 32 engage the front end of the U-shaped member 31, the brakes will be thrown out of operation. It will be understood that antifriction devices 38 may be inserted in the slots 9 and 14, to secure an easy movement of the reaches 1 and 3 relatively to the brake reach 15. It will also be understood that rollers or other anti-friction devices 39 may be secured between the horizontal members of the front bolster to secure an easy movement of the brake mechanism.

In the operation of my invention, when a team hitched to a wagon is pulling on the load, the slots in the reaches 1 and 3 will be so disposed with reference to the coupling pin 8, that the front ends of the slots will bear on the coupling pin to secure the desired result, but that when the team is held back, the reaches 1 and 3 will move forwardly carrying with them the rear bolster 2 and the rear axle 4, which will cause the arms 22 to be disposed rearwardly relatively to the reach 3, as the brake reach 15 will not move with the reaches 1 and 3. This movement of the arms 22 will, by means of the links 27, draw the brake arm 20 toward the tread of the rear wheels, which will cause the brake shoes 21 to bear on the tread of the rear wheels and will have the desired braking effect. When the driver does not wish to have the brakes applied at any time during his journey, he may by the operation of the lever 30, cause the bar 29 to pass through the member 28 and through the brake reach 15, which will secure the brake reach 15 to the axle 4 by which means the operation of the brakes will be prevented. Should the brake mechanism be in operative position and during the journey the driver desire to prevent the operation of the brakes, he may by pulling on the line 35, connect the arm 32 with its notches 33 with the U-shaped member 31 thus securing the upper and lower half of the front bolster together which will prevent the movement of the main reach 1 relatively to the front axle and to the brake reach 15.

Having thus described my invention, I claim as new and desire to secure by Letters Patent:

1. In a wagon brake, an axle, a bolster, main and brake reaches, one reach being adapted to move longitudinally relatively to the other, the axle being adapted to control the relative positions of the reaches, a brake shoe, means connected with the reaches and with the brake shoe which are adapted to operate the latter and means to prevent the relative movement of the reaches.

2. In a wagon brake, an axle, a bolster, main and brake reaches, one reach being adapted to move relatively to the other, the axle being adapted to control the relative positions of the reaches, a brake bar hung to swing on one reach, mechanism connected with the other reach which is adapted to operate the brake bar and means to prevent the relative movement of the reaches.

3. In a wagon brake, main and brake reaches which are adapted to move longitudinally relatively to each other, a brake bar, arms pivoted to one reach, the arms having pivoted connections with the brake bar and with the other reach, and a second set of arms pivoted to the said reach to which is secured the brake bar.

4. In a wagon brake, main and brake reaches which are adapted to move relatively to each other, a brake bar, two arms pivoted to one reach, and a link connecting the two arms, one arm being secured to the other reach and the brake bar being secured to the other arm.

5. In a wagon brake, main and brake reaches which are adapted to move relatively to each other, a brake bar, two arms pivoted to one reach, a link connecting the two arms, one arm being secured to the other reach, the brake bar being secured to the other arm, and means to prevent the relative movement of the reaches.

6. In a wagon brake, a coupling pin, a divided bolster, one half of the bolster having a slot therein, a reach secured to the upper half of the bolster, means which will permit a forward and backward movement of one half of the bolster with reference to its other half but which will prevent any rotary movement of one half relatively to the other, and a brake reach through which the coupling pin passes, the brake reach being adapted to operate means to apply the brakes.

7. In a wagon brake, a coupling pin, a divided bolster, one half of the bolster having a slot therein, a reach secured to the upper half of the bolster, means which will permit a forward and backward movement of one half of the bolster with reference to its other half but which will prevent any rotary movement of one half relatively to the other, a brake reach through which the coupling pin passes, the brake reach being adapted to operate means to apply the brakes, and means to detachably secure the upper and lower halves of the bolster together.

8. In a wagon brake, a coupling pin, a divided bolster, one half of the bolster having a slot therein, a reach secured to the upper half of the bolster, means which will permit a forward and backward movement of one half of the bolster with reference to its other half but which will prevent any rotary movement of one half relatively to the other, a brake reach through which the coupling pin passes, the brake reach being adapted to operate means to apply the brakes, a bar secured to one half of the bolster and an arm pivoted to the other half of the bolster, the arm having notches therein which are adapted to engage the bar, and means to hold the notches on the pivoted arm in locking engagement with the bar.

9. In a wagon brake, a coupling pin, a divided bolster, one half of the bolster having a slot therein, a main reach secured to the upper half of the bolster, means which will permit a forward and backward movement of one half of the bolster with reference to its other half but which will prevent any rotary movement of one half relatively to the other, a brake reach through which the coupling pin passes, the brake reach being adapted to operate means to apply the brakes, a second main reach disposed between the first reach, and a wear plate secured to the brake reach, the wear plate having an end disposed between a bolster member and the last named reach.

10. In a wagon brake, a coupling pin, a divided front bolster, one half of the bolster having a slot therein, a reach secured to the upper half of the bolster, means which will permit the forward and backward movement of one half of the bolster with reference to the other half but which will prevent any relative rotary movement of one half with reference to its other half, a brake reach through which the coupling pin passes, two arms pivoted to the wagon frame, and a link connecting the two arms, one arm being secured to the brake reach, the brake arm being secured to the other arm.

11. In a wagon brake, a coupling pin, a divided front bolster, one half of the bolster having a slot therein, a reach secured to the upper half of the bolster, means which will permit a forward and backward movement of one half of the bolster with reference to the other half but which will prevent any relative rotary movement of one half with reference to its other half, a brake reach through which the coupling pin passes, two arms pivoted to the wagon frame, a link connecting the two arms, one arm being secured to the brake reach, the brake arm being secured to the other arm, and means to prevent the relative movement of the reaches.

12. In a wagon brake, a coupling pin, a divided front bolster, one half of the bolster having a slot therein, a reach secured to the upper half of the bolster, means which will permit a forward and backward movement of one half of the bolster with reference to the other half but which will prevent any relative rotary movement of one half with reference to its other half, a brake reach through which the coupling pin passes, two arms pivoted to the wagon frame, a link connecting the two arms, one arm being secured to the brake reach, the brake arm being secured to the other arm, and means to detachably secure the upper and lower halves of the front bolster together.

In testimony whereof I have signed my name to this specification in the presence of two subscribing witnesses.

EBEN G. DOLAND.

Witnesses:
  VERNE W. ELLISON,
  GEORGE R. STOKES.